United States Patent [19]

Stricker et al.

[11] Patent Number: 5,700,330
[45] Date of Patent: Dec. 23, 1997

[54] PROCESS FOR CLEANING WATER AND ORGANIC SOLVENT BASED LACQUER FROM EQUIPMENT USING A SINGLE SOLVENT MIXTURE

[75] Inventors: Wolfgang Stricker; Udo Hellmann, both of Remscheid; Werner Stephan, Wuppertal, all of Germany

[73] Assignee: Herberts Gesellschaft mit beschrankter Haftung, Germany

[21] Appl. No.: 585,295

[22] Filed: Jan. 11, 1996

[30] Foreign Application Priority Data

Jan. 20, 1995 [DE] Germany .................. 195 01 661.0

[51] Int. Cl.$^6$ .................. B08B 3/08; C11D 7/50; C09D 9/00
[52] U.S. Cl. .................. 134/22.19; 134/38; 510/201; 510/202
[58] Field of Search .................. 134/38, 22.19, 134/26, 40; 510/201, 202, 407, 413

[56] References Cited

U.S. PATENT DOCUMENTS

| | | | |
|---|---|---|---|
| 3,335,087 | 8/1967 | Keers, Jr. | 510/202 X |
| 3,410,805 | 11/1968 | Goldsmith et al. | 510/201 |
| 3,574,123 | 4/1971 | Laugle | 510/202 X |
| 3,856,695 | 12/1974 | Geiss et al. | 134/38 |
| 4,692,263 | 9/1987 | Eberhardt et al. | 134/38 |
| 4,716,056 | 12/1987 | Fox et al. | 427/407.1 |
| 5,332,526 | 7/1994 | Stanley | 252/542 |
| 5,334,256 | 8/1994 | Howe | 134/38 |

FOREIGN PATENT DOCUMENTS

WO 88/06640  9/1988  WIPO .................. 134/38

Primary Examiner—Robert J. Warden
Assistant Examiner—Saeed Chaudhry
Attorney, Agent, or Firm—Merchant, Gould, Smith, Edell, Welter & Schmidt

[57] ABSTRACT

Process for cleaning equipment and equipment cleaner for implementing the process.

The invention relates to a process for cleaning equipment contaminated with lacquer residues, in which the lacquer residues are removed with a solvent mixture and an equipment cleaner based on a solvent mixture for implementing the process. The solvent mixture contains A) 15–35 wt. % of one or more glycol ethers of the general formula I $$OH-(CH_2-CH_2-O)_m-R_1 \qquad I$$

where $R_1 = C_{1-4}$-alkyl and m=1 or 2 and

B) 65–85 wt. % of one or more aliphatic ketones of the general formula II $$R_2-\underset{\underset{O}{\|}}{C}-R_3 \qquad II$$

where $R_2 = C_{1-3}$-alkyl and $R_3 = C_{1-3}$-alkyl and $R_2$ and $R_3$ may be identical or different.

4 Claims, No Drawings

PROCESS FOR CLEANING WATER AND ORGANIC SOLVENT BASED LACQUER FROM EQUIPMENT USING A SINGLE SOLVENT MIXTURE

FIELD OF THE INVENTION

The invention relates to a process for cleaning equipment contaminated with lacquer residues, in which the lacquer residues are removed with a solvent mixture, and a solvent-based equipment cleaner, which is used in lacquering work for cleaning and/or removing lacquer residues from containers, spray guns and the like, for example. The equipment cleaner can be used in the processing of both solvent-based and water-dilutable lacquer materials.

BACKGROUND OF THE INVENTION

In lacquering work, such as vehicle lacquering or other industrial fields of use, it is necessary to clean the application equipment thoroughly, such as spray guns in particular, after lacquering and also when a colour, or the type of lacquering material to be applied, is changed.

Firstly the lacquer is emptied out of the gun. A little washing solvent is then placed in the container and the gun blown through. This process is repeated until only pure solvent comes out of the nozzle aperture. The gun is then wiped dry with a lint-free cloth. For thorough cleaning, the spray gun is partially disassembled and the individual components are cleaned with washing solvent.

In addition to this manual method it is also possible to clean the disassembled spray gun in specific automatic cleaning devices (e.g. in a "Drestler Muschel").

In the processing of the solvent-based lacquers that have been conventionally used in the past, examples of the washing solvent that is used are aromatics, such as toluene, xylene and esters, such as ethyl acetate, isopropyl acetate, isobutyl acetate, n-butyl acetate and benzene fractions with a flashpoint below 21° C.

For ecological reasons, it is becoming current practice increasingly to use water-based lacquer materials. The conventionally used cleaning agents cannot, however, be used when water-dilutable lacquers are employed. If water-dilutable lacquer residues come into contact with the above-mentioned conventional cleaning solvents, this leads to coagulation phenomena, the water-dilutable products precipitate out. Other solvents, viz. water-miscible and/or water-soluble ones, must therefore be used for cleaning purposes with water-based lacquers. In turn these solvents are not suitable for solvent-based lacquers. Here also, the above-mentioned coagulation phenomena occur.

This means that if solvent-based and water-based lacquers are processed alongside one another, two cleaning fluids, matched to the two systems in each case, are required and if cleaning is carried out using an automatic cleaner, two of these automatic cleaners must also be available.

SUMMARY OF THE INVENTION

The object of the invention was therefore to devise a process for cleaning equipment contaminated with lacquer residues and an equipment cleaner for implementing the process, which can be universally used for water-based and solvent-based lacquer materials.

This object was achieved by means of a process of the above-mentioned type which is characterized in that the solvent mixture used is one which contains A) 15–35 wt. % of one or more glycol ethers of the general formula I $$OH-(CH_2-CH_2-O)_m-R_1 \qquad I$$

where $R_1=C_{1-4}$-alkyl and m=1 or 2 and

B) 65–85 wt. % of one or more aliphatic ketones of the general formula II $$R_2-\underset{\underset{O}{\|}}{C}-R_3 \qquad II$$

where $R_2=C_{1-3}$-alkyl and $R_3=C_{1-3}$-alkyl and $R_2$ and $R_3$ may be identical or different, wherein A)+B) add up to 100 wt. %.

The present invention also provides an equipment cleaner based on a solvent mixture for implementing the process, which is characterized in that it contains A) 15–35 wt. % of one or more glycol ethers of the general formula I $$OH-(CH_2-CH_2-O)_m-R_1 \qquad I$$

where $R_1=C_{1-4}$-alkyl and m=1 or 2 and

B) 65–85 wt. % of one or more aliphatic ketones of the general formula II $$R_2-\underset{\underset{O}{\|}}{C}-R_3 \qquad II$$

where $R_2=C_{1-3}$-alkyl and $R_3=C_{1-3}$-alkyl and $R_2$ and $R_3$ may be identical or different, wherein A)+B) add up to 100 wt. %.

DETAILED DESCRIPTION OF THE INVENTION

Surprisingly it was found that both solvent-based and water-dilutable lacquer residues can be satisfactorily dissolved with the solvent mixture according to the invention and the cleaning action develops equally well universally, including in the case of the most varied lacquer materials such as primer, filler, base lacquer, top coat lacquer.

Component A) of the cleaning agent according to the invention is glycol ethers of the above-mentioned general formula I. Examples of such glycol ethers are methyl glycol, ethyl glycol, butyl glycol, methyl diglycol, ethyl diglycol, butyl diglycol. Methyl diglycol and butyl diglycol are preferred.

Component B) of the cleaning agent according to the invention is aliphatic ketones of the general formula II. Examples of these ketones are acetone, diethylketone, diisobutylketone, methylethylketone, methyl-n-propylketone. Acetone and methylethylketone are preferred.

The equipment cleaner according to the invention can be used to clean spray guns, containers and the like that are contaminated with water-dilutable or solvent-based lacquer residues. It is a universal cleaner that exhibits an equally good cleaning action for the most varied lacquer materials. The elimination and/or removal of the lacquer residues in the automatic cleaner takes place solely by means of the cleaning action of the solvent mixture according to the invention, additional operations, such as working with a brush, are not required.

Examples of different lacquer materials that may be quoted are: stone impact protection, PE-spray plastic, plastic primer, 1-component primer, plastic filler, 2-component filler, 1-component hydrofiller, base lacquer, water-based base lacquer, 2-component top coat lacquer, water-based top coat lacquer. The coating agents quoted can be based on all binders which are known and conventionally used for the specific coating agent. Examples are alkyd, polyurethane, polyurethane-urea, polyester, polyacrylate binders, epoxy resins, which can be combined with various crosslinking agents such as polyisocyanates (optionally blocked), amino resins, polyamines, transesterification crosslinking agents.

When cleaning equipment contaminated with water-based lacquers it is advantageous initially to pre-clean the equipment with water and then to use the equipment cleaner according to the invention. Contamination consisting of solvent-based lacquers can be directly removed with the cleaner according to the invention.

The invention will be illustrated with the aid of examples.

EXAMPLES 1 AND 2 AND COMPARATIVE EXAMPLES 3–8

Solvent mixtures comprising 75 wt. % of acetone and 25 wt. % of methyl diglycol and/or butyl diglycol are made. Further solvent mixtures are made for comparison purposes according to Table 1 (columns 3–8). Dissolving power and miscibility of the individual solvent mixtures for various lacquer materials are evaluated in Table 2.

TABLE 1

| Solvent | Mixture | | | | | | | |
|---|---|---|---|---|---|---|---|---|
|  | 1 | 2 | 3 | 4 | 5 | 6 | 7 | 8 |
| Acetone | 75 | 75 | 75 | 75 | 33 | 75 |  |  |
| Methyl ketone |  |  |  |  |  |  | 33 |  |
| Methyl diglycol | 25 |  |  |  |  |  |  |  |
| Butyl diglycol |  | 25 |  |  |  |  |  |  |
| Butyl acetate |  |  |  |  | 33 |  | 33 | 33 |
| Xylene |  |  |  | 25 |  |  | 34 |  |
| Isopropanol |  |  |  |  | 34 |  |  |  |
| NMP |  |  | 25 |  |  |  |  |  |
| Butyrolactone |  |  |  |  |  | 25 |  |  |
| Butyl glycol |  |  |  |  |  |  |  | 33 |
| Water |  |  |  |  |  |  |  | 34 |

TABLE 2

| Coating agent | Miscibility and dissolving power | | | | | | | |
|---|---|---|---|---|---|---|---|---|
|  | 1 | 2 | 3 | 4 | 5 | 6 | 7 | 8 |
| solvent-based | | | | | | | | |
| 1C primer | s. | s. | s. | s. | s. | s. | s. | s. |
| 2C filler | s. | s. | s. | s. | s. | s. | s. | s. |
| 2C top coat lacquer | s. | s. | s. | s. | s. | s. | s. | s. |
| 2C epoxy filler | s. | s. | s. | s. | s. | s. | s. | s. |
| PE-spray plastic | s. | s. | s. | s. | s. | s. | s. | n.s. |
| Plastic-primer | s. | s. | s. | s. | s. | s. | s. | n.s. |
| Plastic-filler | s. | s. | s. | s. | s. | s. | s. | n.s. |
| 2C plastic filler | s. | s. | s. | s. | s. | s. | s. | s. |

TABLE 2-continued

| Coating agent | Miscibility and dissolving power | | | | | | | |
|---|---|---|---|---|---|---|---|---|
|  | 1 | 2 | 3 | 4 | 5 | 6 | 7 | 8 |
| Water-dilutable | | | | | | | | |
| 1C hydro-filler | s. | s. | n.s. | n.s. | n.s. | n.s. | n.s. | n.s. |
| 2C hydro-filler | s. | s. | s. | s. | n.s. | s. | n.s. | n.s. |
| Hydro top coat lacquer | s. | s. | s. | s. | s. | s. | n.s. | s. |
| Hydro base coat lacquer | s. | s. | s. | n.s. | s. | s. | n.s. | s. |
| Stone impact protection | s. | s. | n.s. | n.s. | n.s. | n.s. | n.s. | n.s. | s. = satisfactory
n.s. = not satisfactory.

Table 2 shows that a large number of solvent mixtures is suitable for removing various lacquer contaminations. Surprisingly, however, only the solvent mixtures according to the invention can be used universally for cleaning purposes with all solvent-based and water-dilutable lacquers quoted.

We claim:

1. A process for cleaning equipment contaminated with a lacquer residue, comprising:

contacting the equipment, which has been contaminated with either an organic solvent-based lacquer residue or an aqueous-based lacquer residue, with a solvent mixture to remove the lacquer residue, wherein the solvent mixture consists essentially of:

A) 15–35 wt. % of one or more glycol ethers of the general formula I

wherein $R_1=C_{1-4}$-alkyl and $m=1$ or 2 and

B) 65–85 wt. % of one or more aliphatic ketones of the general formula II

wherein $R_2=C_{1-3}$-alkyl and $R_3=C_{1-3}$=alkyl and $R_2$ and $R_3$ may be identical or different, and wherein the A)+B) wt. %'s add up to 100 wt. %.

2. A process according to claim 1, wherein methyl diglycol or butyl diglycol or a mixture thereof is used as Component A.

3. A process according to claim 1, wherein acetone or methylethylketone or a mixture thereof is used as Component B.

4. A process according to claim 1, further comprising precleaning the equipment with water wherein the equipment is contaminated with a residue of a water-based lacquer.

* * * * *